SALMON & BLISS.
Upsetting Tires.

No. 31,478.

Patented Feb. 19, 1861.

Witnesses:
J. H. Coomby
R. S. Spencer

Inventors:
W. C. Salmon
G. H. Bliss
per Munn & Co.
Attorneys.

UNITED STATES PATENT OFFICE.

W. C. SALMON AND GEO. F. BLISS, OF PLACERVILLE, CALIFORNIA.

MACHINE FOR UPSETTING TIRES.

Specification of Letters Patent No. 31,478, dated February 19, 1861.

*To all whom it may concern:*

Be it known that we, W. C. SALMON and GEORGE F. BLISS, of Placerville, in the county of Eldorado and State of California, have invented a new and Improved Tire-Upsetting Machine; and we do hereby declare that the following is a full, clear, and exact description thereof, reference being had to the accompanying drawings, making a part of this specification, in which—

Figure 1:
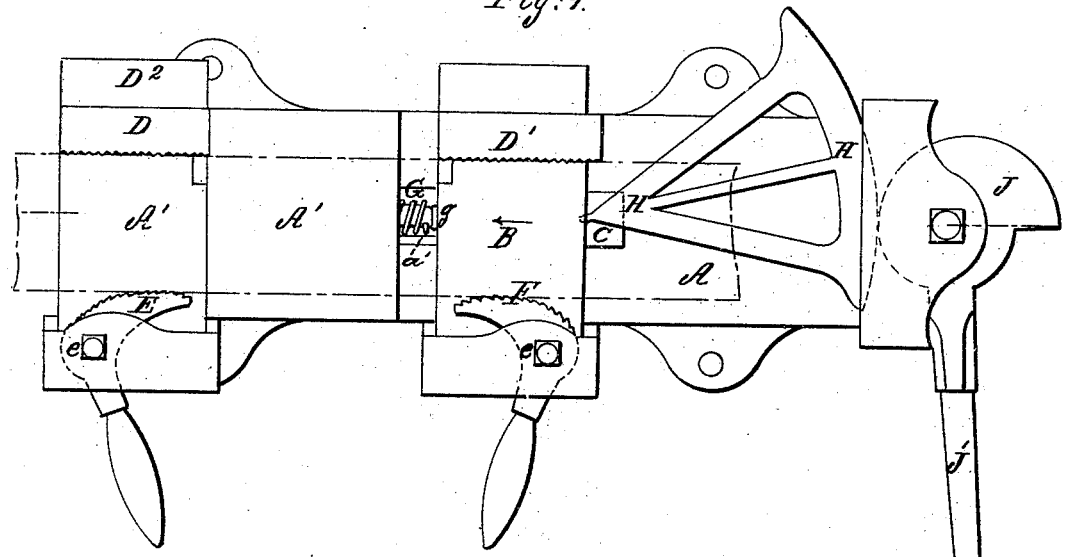
Figure 2:
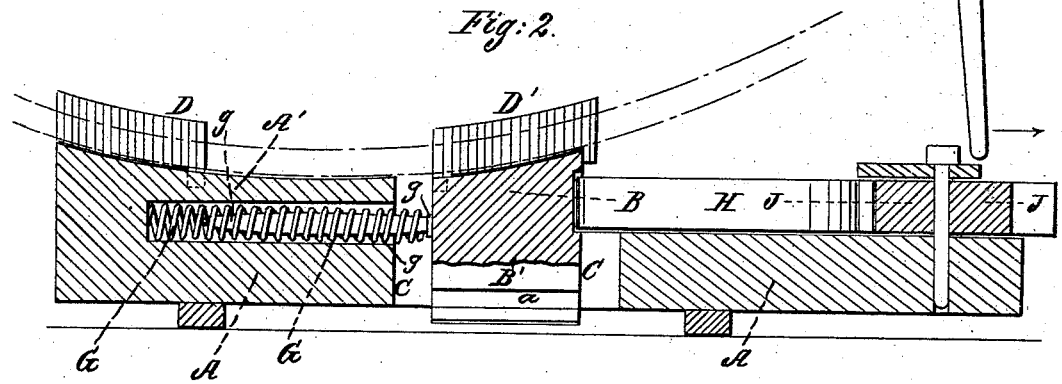

Figure 1, is a plan view of the improved tire upsetting machine. Fig. 2, is a vertical longitudinal section taken through the middle of Fig. 1.

Similar letters of reference indicate corresponding parts in both figures.

This invention, an improvement in upsetting or shrinking tires for wheels, is to enable the operator to work at the machine to a much greater advantage both as regards a saving of time and power.

The invention consists in a combination of stationary and movable bed plates, having clamping jaws on them, for grasping and holding the tire securely, as will be hereinafter described, with a sector and cam lever for shrinking the tire after it is properly clamped to the beds; and a spring which throws the movable jaw back after it has been acted upon by the cam and sector, all as will be hereinafter fully explained.

To enable those skilled in the art to make and use our invention, we will proceed to describe its construction and operation.

A, is a bar of metal which is securely fastened to a block, bench, trestle, or any suitable object, where the machine can be conveniently used; and on one end of this bar A, on the top of the bar, is permanently secured a bed piece A', the surface of which is curved longitudinally so that this curve will conform to the circumference of the tires which are placed thereon, to be upset or contracted.

B, is the movable bed piece the top surface of which forms a part of the circle of which the curve of the bed piece A' is the segment; and this movable bed piece B, has a longitudinal tenon B', projecting down from its center through a longitudinal slot C, which is formed through the bar A, as shown in Figs. 1 and 2, of the drawings, which tenon keeps the bed piece in its proper position on the bar A, with relation to the piece A', and prevents it from being moved laterally out of its place.

A longitudinal slot $a$, is formed on one side, and near the lower end of the tenon projection B', into which a tenon $a'$, passes, when the bed piece B, is forced nearly home, which tenon and slot prevent this bed piece B, from working upward. In this manner the movable bed piece is only allowed to have a longitudinal play on the bar A, up to, and from, the stationary bed A'.

D, is a jaw having a serrated surface, inside, which bears against a shoulder $D^2$, which projects up from one side of bed piece A', above the top of this piece and serves the purpose of a back rest for the jaw in the operation of clamping a tire to the bed A'. D', is a jaw constructed in a similar manner to the jaw D, and applied to the movable bed piece B, in the position shown in Figs. 1 and 2, of the drawings. Both of these serrated blocks or steel jaws D, and D', fit into depressions which are made in their respective bed pieces, which prevent the jaws from moving out of their proper places on their beds.

On the opposite sides of the bed pieces A', and B, to the jaws D, and D', are arranged the dogs or cam jaws E, and F, which are pivoted at $e, e'$, to the upper surfaces of their respective bed pieces, and have lever handles projecting out from them for setting them up tightly to the edge of the tire before the operation of shrinking it is begun. The cam dogs E, and F, are so constructed and applied with relation to their respective jaws D, and D', that when these dogs E, and F, are forced up tightly against the tire, the tire will be held securely against the jaws D, and D', and when the pressure which is necessary to shrink the tire is applied to the movable bed piece B, the tire will be confined still more tightly between the dogs and jaws.

G, is a helical spring into one end of which passes a stiffening pin $g$. This spring G, is passed into a longitudinal hole which is in the bed piece A', and the spring projects out of this hole a suitable distance to act upon the bed piece B, to throw it back from the bed piece A', after the operation of shrinking or upsetting the tire. The spring G, may be provided with a stop pin which will fit into a longitudinal slot which may be cut in the pin that passes into the spring, so that this spring may be adjusted so as to move the bed piece B, away from the bed A', any desirable distance.

H, is a horizontal sector which is placed on the top of bar A, behind the movable bed piece B, the point of which bears against the rear end of this bed piece, and J, is a horizontal cam with a long arm J', projecting out from it, by means of which cam and lever, the sector H, is forced along the bar A, moving before it the bed piece B, up toward the bed piece A'.

The operation of the machine is as follows: The tire which it is required to shrink is first brought to the proper degree of heat, it is then placed on the bed plates A' and B, when they are in the relative positions shown in Figs. 1 and 2, and clamped to each of these plates by the clamps E, D, and D', and F, as before described. The lever J', of cam J, is then carried around in the direction of the arrow marked in Fig. 1, and this cam J, through the medium of sector H, will force the bed piece B, toward the bed piece A', and upset the metal of that part of the tire which is confined between the two bed plates A', and B. The lever J', is now thrown back and when the clamps are released from the bed plates A', and B, the latter bed plate will be forced back to its original position ready for a second operation. When the bed plate B, is started forward by the cam J, the tenon a' which projects out from the inside of the slot C, as shown in Fig. 1, enters the slot a, in the tenon B', of the movable bed B, and prevents this bed plate from rising during the operation of upsetting a tire.

Having thus described our invention, what we claim as new and desire to secure by Letters Patent is—

The combination of the stationary and movable bed plates A', and B, their clamping dogs E, and F, and jaws D, and D', as set forth, with the spring G, sector H, and cam J, with its lever J', all arranged and operating in the manner and for the purposes herein set forth.

W. C. SALMON.
GEO. F. BLISS.

Witnesses:
  A. SIMONTON,
  L. L. COMPTON.